(12) United States Patent
Yoshida et al.

(10) Patent No.: US 8,310,609 B2
(45) Date of Patent: Nov. 13, 2012

(54) LIQUID CRYSTAL DEVICE, ELECTRONIC APPARATUS, AND METHOD OF MANUFACTURING LIQUID CRYSTAL DEVICE

(75) Inventors: Shuhei Yoshida, Tottori (JP); Shinichiro Tanaka, Tottori (JP); Joji Nishimura, Matsumoto (JP); Koji Yoshida, Tottori (JP); Keiji Takizawa, Azumino (JP); Masakatsu Higa, Tottori (JP)

(73) Assignee: Sony Corporation, Tokyo (JP)

( * ) Notice: Subject to any disclaimer, the term of this patent is extended or adjusted under 35 U.S.C. 154(b) by 635 days.

(21) Appl. No.: 12/540,028

(22) Filed: Aug. 12, 2009

(65) Prior Publication Data

US 2010/0079694 A1 Apr. 1, 2010

(30) Foreign Application Priority Data

Sep. 30, 2008 (JP) .................................. 2008-252585
Jun. 3, 2009 (JP) .................................. 2009-133778

(51) Int. Cl.
*G02F 1/1333* (2006.01)
*G02F 1/1343* (2006.01)
*G02F 1/1345* (2006.01)
*G02F 1/1335* (2006.01)
*G02F 1/13* (2006.01)

(52) U.S. Cl. ............ 349/40; 349/59; 349/141; 349/149; 349/106; 349/192

(58) Field of Classification Search ............... 349/40, 349/59, 141, 149, 106, 192
See application file for complete search history.

(56) References Cited

U.S. PATENT DOCUMENTS

| 6,346,932 B1 * | 2/2002 | Maeda ............................. 345/90 |
| 6,950,165 B2 * | 9/2005 | Matsumoto et al. .......... 349/141 |
| 7,633,566 B2 * | 12/2009 | Utsunomiya et al. ........... 349/12 |
| 8,004,644 B2 * | 8/2011 | Kurasawa ...................... 349/141 |
| 2011/0102732 A1 * | 5/2011 | Washizawa .................... 349/187 |

FOREIGN PATENT DOCUMENTS

JP A-2001-51263 2/2001

* cited by examiner

*Primary Examiner* — Mike Qi
(74) *Attorney, Agent, or Firm* — K&L Gates LLP

(57) ABSTRACT

Provided is a lateral electric field mode liquid crystal device including: a first substrate; a second substrate; a liquid crystal layer and pixel electrodes and common electrodes. A lateral electric field mode liquid crystal device drives the liquid crystal layer by an electric field generated between the pixel electrodes and the common electrodes, a light shielding layer is formed on a surface of the second substrate disposed close to the liquid crystal layer. A coloring layer is also formed so as to overlap with the pixel electrodes. An overcoat layer protects the coloring layer, and an alignment film is formed. An electrostatic shielding layer is formed of a transparent conductive material on a surface of the overcoat layer.

11 Claims, 9 Drawing Sheets

LIQUID CRYSTAL DEVICE, ELECTRONIC APPARATUS, AND METHOD OF MANUFACTURING LIQUID CRYSTAL DEVICE

BACKGROUND

1. Technical Field

The present invention relates to a liquid crystal device, an electronic apparatus, and a method of manufacturing a liquid crystal device.

2. Related Art

As a means for achieving a wide viewing angle of a liquid crystal device, an IPS (In-Plane Switching) mode, which is one example of a so-called lateral electric field mode, has been put into practical use, in which an electric field is generated in an in-plane direction (lateral direction) to a substrate, the lateral electric field causes liquid crystal molecules contained in a liquid crystal layer to be rotated in a plane parallel of the substrate, thus controlling the transmission of light. Further, an FFS (Fringe-Field Switching) mode is proposed as an improvement of the IPS mode.

Such a lateral electric field mode liquid crystal device has a configuration in which electrodes such as common electrodes and pixel electrodes or conductive members such as wirings are arranged on an element substrate having formed thereon driving elements such as TFT (thin film transistors), whereas conductive members are not arranged on a counter substrate which is disposed close to the display surface. For this reason, there is a problem in terms of display quality in that such a liquid crystal device is likely to be affected by electric fields (external electric fields) from outside of the counter substrate, typically static electricity, and thus, irregularities in the liquid crystal display are likely to occur. In order to solve such a problem, a method has been proposed in which an electrostatic shielding layer formed of a transparent conductive film is formed on the side of the counter substrate so that static electricity is trapped in the electrostatic shielding layer, thereby preventing display irregularities (see JP-A-2001-051263, for example).

JP-A-2001-051263 discloses a configuration of the counter substrate in which the electrostatic shielding layer is provided on the outer side (the side opposite to the liquid crystal layer) of the glass substrate and a configuration in which the electrostatic shielding layer is provided on the inner side (the side of the liquid crystal layer) of the glass substrate. When the two configurations are compared, the counter substrate having the electrostatic shielding layer on the inner side thereof has an advantage of being easy to manufacture because the electrostatic shielding layer can be formed by being laminated on members provided on the inner side such as an alignment film, and it is thus not necessary to reverse the glass substrate.

In recent years, there has been an increasing demand for achieving a thin liquid crystal device, and in order to comply with such a demand, a pair of substrates (later-described element substrate and counter substrate) sandwiching the liquid crystal layer is often polished to achieve a small thickness. Such a polishing step is performed after the pair of substrates is bonded together by a sealing member so as to face each other. As described above, in the case of arranging the electrostatic shielding layer on the outer surface, since the electrostatic shielding layer cannot be arranged prior to the polishing step, anti-static electricity measures are insufficient in the previous steps of the polishing step.

The electrostatic shielding layer is obtained by forming an electrostatic shielding layer from ITO (indium tin oxide alloys) under high-temperature and in a vacuum. When the electrostatic shielding layer is arranged after the polishing step, namely after the pair of substrates is bonded together, the element substrate and the counter substrate are exposed to the high-temperature in a vacuum, the forming material (typically, resin) of the sealing member or a color filter layer may be deteriorated or peelings may occur at the interface or the inside of the resin. For this reason, in the configuration of having the electrostatic shielding layer at the outer side of the glass substrate of the counter substrate, it is difficult to achieve the anti-static electricity measures (namely, the improvement in the display quality) and a small thickness of the liquid crystal device. Therefore, the configuration of having the electrostatic shielding layer at the inner side of the counter substrate is advantageous. That is to say, by performing the polishing step after bonding the pair of substrates together, it is possible to achieve a small thickness of the liquid crystal device and improve the display quality.

However, JP-A-2001-051263 discloses a structure in which the electrostatic shielding layer is formed at the back surface of an alignment film on the side of the counter substrate as an example of the configuration having the electrostatic shielding layer at the inner side of the glass substrate. When the electrostatic shielding layer is provided at such a position, only the alignment film is present between the electrostatic shielding layer and the liquid crystal layer, and thus, the distance between them decreases. For this reason, a vertical electric field is generated between the electrostatic shielding layer for trapping static electricity and the pixel electrodes or the common electrodes provided on the element substrate, thus disadvantageously disturbing the lateral electric field mode driving. Therefore, the anti-static electricity measures of the liquid crystal device are insufficient.

In order to cope with such circumstances, a liquid crystal device according to a comparative example is proposed as described below. FIG. 5 is a schematic cross-sectional view of a liquid crystal device 3 according to the comparative example. The liquid crystal device 3 has a similar configuration as the liquid crystal device according to later-described respective embodiments, and most of the constituent elements are the same. The descriptions of the respective constituent elements will be provided later, and the arrangement of the electrostatic shielding layer will be described.

As illustrated in the drawing, in the liquid crystal device 3, an electrostatic shielding layer 40 is directly formed as the first layer on a counter substrate body 21 without via any intervening layer. Since there is no underlying layer, it is practically impossible to form an alignment mark in advance and it is thus difficult to apply a mask film forming method that positions a mask on the counter substrate body 21 to form a film on a local area of the counter substrate body 21. Therefore, the electrostatic shielding layer 40 is formed on the entire surface of the counter substrate body 21 in a so-called beta form. When the electrostatic shielding layer 40 is formed in the beta form, the end face of the counter substrate body 21 becomes even with the end face of the electrostatic shielding layer 40 at the end portion B of the counter substrate 20. That is to say, the end face of the counter substrate body 21 and the end face of the electrostatic shielding layer 40 become identical to each other in a plan view. In the case of having such a shape, namely when the end faces are even with each other, static electricity can easily enter and the corrosion of the electrostatic shielding layer 40 is likely to occur.

SUMMARY

An advantage of some aspects of the invention is that it provides a liquid crystal device having an excellent electrostatic protection function and capable of suppressing display quality reduction resulting from external static electricity and achieving a small thickness. Another advantage of some aspects of the invention is that it provides an electronic apparatus including such a liquid crystal device.

The invention aims to solve at least part of the above described problems and can be actualized as a form or an application described below.

Application 1

A lateral electric field mode liquid crystal device including: a first substrate; a second substrate; a liquid crystal layer sandwiched between the first substrate and the second substrate; and pixel electrodes and common electrodes which are formed on a surface of the first substrate disposed close to the liquid crystal layer, the lateral electric field mode liquid crystal device driving the liquid crystal layer by an electric field generated between the pixel electrodes and the common electrodes, wherein on a surface of the second substrate disposed close to the liquid crystal layer, a light shielding layer which is formed in areas including an area disposed between the pixel electrodes in a plan view and is capable of absorbing at least visible light, a coloring layer which is formed so as to overlap with the pixel electrodes in a plan view and is capable of transmitting light in a particular wavelength range, an overcoat layer for protecting the coloring layer, and an alignment film are formed in this order, and wherein an electrostatic shielding layer formed of a transparent conductive material is formed on a surface of the overcoat layer disposed close to the second substrate and a surface of the light shielding layer disposed close to the liquid crystal layer.

According to such a configuration, since the electrostatic shielding layer and the liquid crystal layer are spaced apart by at least the thickness of the overcoat layer, thus causing a voltage drop, it is possible to weaken the force (coulomb force) of the static electricity trapped in the electrostatic shielding layer acting on the liquid crystal layer. Due to such a configuration, compared to a configuration where the electrostatic shielding layer is directly formed on the back surface of the alignment film disposed close to the counter substrate, the display irregularities resulting from static electricity can be reduced, and the display quality can be improved.

Moreover, the alignment mark can be formed at the same time as (in bundle with) the light shielding layer, and thus, the electrostatic shielding layer can be formed by a mask film forming method using the alignment mark. As a result, steps can be formed between the end face of a glass substrate of the counter substrate and the end face of the electrostatic shielding layer, thus improving the reliability.

Application 2

In the liquid crystal device according to Application 1, the coloring layer is formed on a surface of the electrostatic shielding layer disposed close to the liquid crystal layer.

According to such a configuration, the distance between the electrostatic shielding layer and the liquid crystal layer can be further increased. Due to such a configuration, it is possible to reduce further display irregularities resulting from the static electricity and further improve the display quality.

Application 3

In the liquid crystal device according to Application 1, the coloring layer is formed on a surface of the electrostatic shielding layer disposed close to the second substrate.

According to such a configuration, it is possible to prevent the thickness of the coloring layer from affecting the function of the electrostatic shielding layer, namely the function of shielding static electricity. Due to such a configuration, it is possible to obtain an easy-to-design liquid crystal device.

Application 4

In the liquid crystal device according to Application 2, the electrostatic shielding layer is not formed in at least a portion of an outer edge portion of the second substrate.

According to such a configuration, it is possible to suppress corrosion of the electrostatic shielding layer in the above-mentioned areas and improve the reliability of the liquid crystal device. Here, the "outer edge portion" means the outer edge area in a plan view, namely as viewed in a direction perpendicular to a substrate plane, in other words, a loop-shaped (frame-shaped) area.

Application 5

In the liquid crystal device according to Application 4, steps are formed at a boundary portion of the light shielding layer and the coloring layer, and an uneven surface resembling the steps is formed on a top surface of the electrostatic shielding layer.

According to such a configuration, an uneven surface resembling the shape of the steps is formed on the top surface of the electrostatic shielding layer. The uneven portion functions as a lightning conductor to external static electricity, making it easy to trap the external static electricity compared to the electrostatic shielding layer having a flat surface. Due to such a configuration, the electrostatic shielding layer has an excellent shielding effect, and thus, a liquid crystal device capable of suppressing the irregularities in images due to the influence of static electricity can be provided.

Application 6

In the liquid crystal device according to Application 1, a driving circuit and drawing lines electrically connected to the driving circuit are formed on the surface of the first substrate disposed close to the liquid crystal layer, the drawing lines and the electrostatic shielding layer are electrically connected at positions where they overlap with each other in a plan view via a conductive member sandwiched between the first substrate and the second substrate, and the potential of the electrostatic shielding layer is controlled to be at predetermined potential by the driving circuit.

According to such a configuration, since the charges of the static electricity trapped in the electrostatic shielding layer are maintained at predetermined potential, the static electricity is not accumulated or increased even after a long period of use, and thus a liquid crystal device capable of suppressing the irregularities in images due to the influence of the static electricity can be provided. Moreover, since the electrostatic shielding layer is connected to the drawing lines connected to the driving circuit, it is possible to discharge the charges accumulated in the electrostatic shielding layer without needing to form any new conductive constituent member and provide a liquid crystal device capable of suppressing the irregularities in images due to the influence of the static electricity.

Application 7

In the liquid crystal device according to Application 6, the potential of the electrostatic shielding layer is controlled to be at the same potential as the common electrodes.

According to such a configuration, since there is no potential difference between the electrostatic shielding layer and the common electrodes, a vertical electric field can hardly be generated between the first substrate and the second substrate, and thus, a liquid crystal device capable of suppressing the irregularities in images can be provided.

Application 8

In the liquid crystal device according to Application 6, the first substrate has an insulating film which covers the drawing lines, contact holes are formed in the insulating film so as to expose portions of the drawing lines to a bottom portion thereof, a conductive film is formed in an inner portion of each of the contact holes so as to cover the drawing lines exposed to the bottom portion, and the electrostatic shielding layer is electrically connected to the drawing lines via the conductive member and the conductive film.

According to such a configuration, since it is possible to prevent oxidation of the drawing lines and realize an excellent conduction state, the charges accumulated in the electrostatic shielding layer can be effectively discharged, and thus, a liquid crystal device capable of providing excellent display quality can be provided. Drawing lines formed of base metals such as aluminum are particularly preferable because they can effectively prevent surface oxidation and realize a reliable conduction state.

Application 9

In the liquid crystal device according to Application 8, the conductive film is formed of conductive metal oxides.

According to such a configuration, it is possible to effectively prevent oxidation of the drawing lines exposed to the bottom portion of the contact holes.

Application 10

In the liquid crystal device according to Application 1, the pixel electrodes and the common electrodes are laminated on the surface of the first substrate disposed close to the liquid crystal layer via the insulating film, and the common electrodes are disposed closer to the liquid crystal layer than the pixel electrodes.

According to such a configuration, the distance between the electrostatic shielding layer for trapping static electricity and the pixel electrodes can be increased further. Due to such a configuration, it is possible to suppress the vertical electric field generated between the pixel electrodes and the electrostatic shielding layer to a very weak level and provide a liquid crystal device capable of suppressing the irregularities in images.

Application 11

In the liquid crystal device according to Application 1, a sealing member for sealing liquid crystal molecules is provided around the liquid crystal layer, a display area defined by the plurality of pixel electrodes is formed at an inner side of the area surrounded by the sealing member, and a non-display area is formed between the display area and the sealing member at the inner side of the area surrounded by the sealing member, electrostatic protection members capable of discharging static electricity entering into the display area are arranged on the non-display area of the first substrate, and the electrostatic shielding layer is disposed so as to overlap with the electrostatic protection members in a plan view.

According to such a configuration, since the electrostatic shielding layer also protects the electrostatic protection members arranged on the non-display area, the display area can be effectively protected, and thus a liquid crystal device capable of effectively suppressing the irregularities in images and preventing an electrostatic breakdown can be provided.

Application 12

An electronic apparatus including the liquid crystal device according to Application 1.

According to such a configuration, it is possible to provide an electronic apparatus having the liquid crystal device free from display irregularities resulting from static electricity in the external environment and capable of displaying high-quality images.

Application 13

A method of manufacturing a lateral electric field mode liquid crystal device including: a first substrate and a second substrate which are disposed to face each other; a liquid crystal layer which is sandwiched between the first substrate and the second substrate; pixel electrodes and common electrodes which are formed on a surface of the first substrate disposed close to the liquid crystal layer; a light shielding layer which is formed on a surface of the second substrate, in a plan view, disposed close to the liquid crystal layer in areas including an area disposed between the pixel electrodes and is capable of absorbing at least visible light; and an electrostatic shielding layer which is formed on a surface of the light shielding layer disposed close to the liquid crystal layer and is formed of a transparent conductive material, the lateral electric field mode liquid crystal device driving the liquid crystal layer by an electric field generated between the pixel electrodes and the common electrodes, the method including the steps of: forming a light shielding material layer on one surface of the second substrate; patterning the light shielding material layer to form openings and alignment marks which correspond to areas including the pixel electrodes in a plan view; disposing a film forming mask so as to face the one surface to positioning the second substrate and the film forming mask using the alignment marks; and forming a transparent conductive material layer on the one surface via the film forming mask to form the electrostatic shielding layer.

According to such a manufacturing method, it is possible to form an electrostatic shielding layer having an arbitrary planar shape (a shape in a plan view) on the one surface. Due to such an electrostatic shielding layer, it is possible to improve the display quality of the liquid crystal device without deteriorating the reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
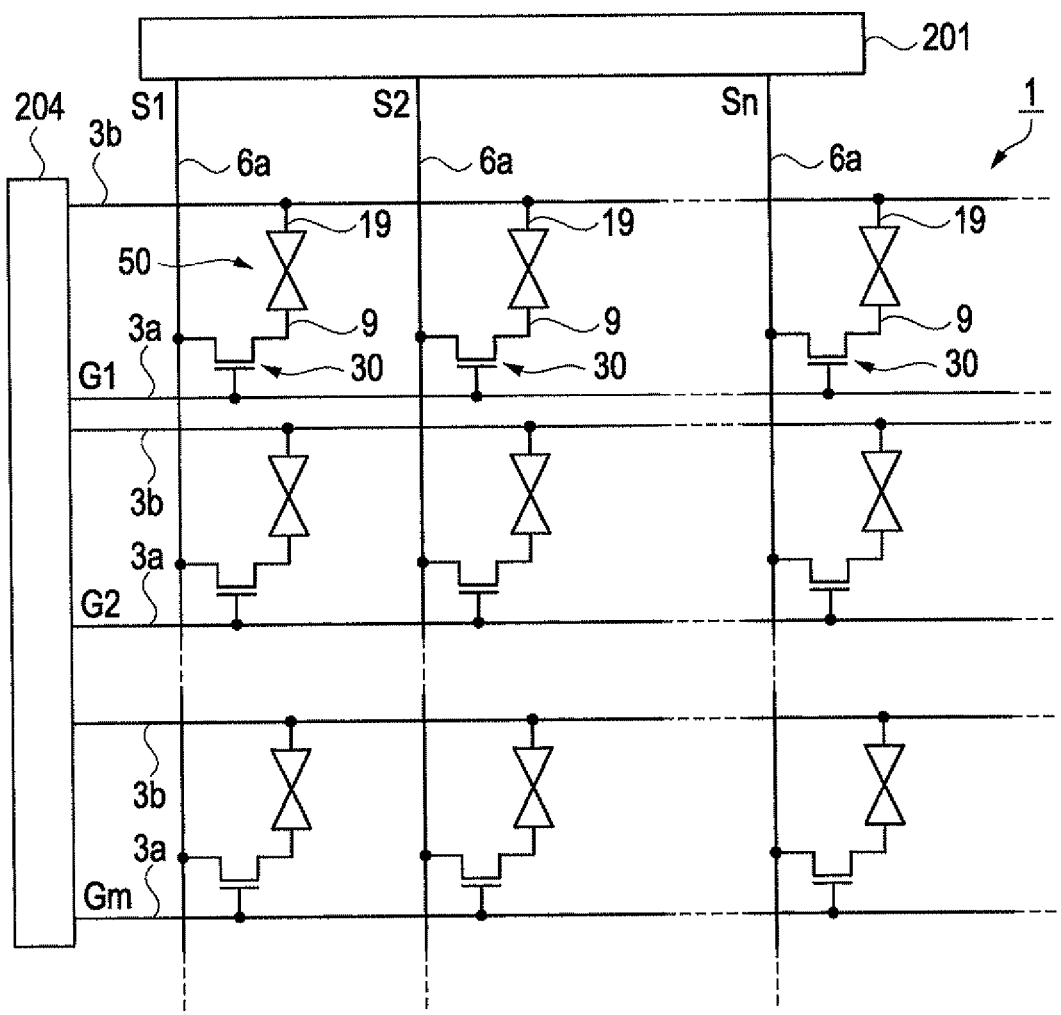
FIG. 1 is an equivalent circuit diagram of a liquid crystal device according to a first embodiment of the invention.

A liquid crystal device 1 according to a first embodiment of the invention will be described herein below with reference to FIGS. 1 to 5. In the drawings below, individual members are appropriately depicted with different thicknesses and measurements in order to make them recognizable in the drawings.

The liquid crystal device according to the present embodiment displays images by controlling the azimuth angle of liquid crystal molecules by using a lateral electric field perpendicular to the light traveling direction. An IPS (In-Plane Switching) mode and an FFS (Fringe-Field Switching) mode are known as examples of such a lateral electric field mode. Although the descriptions below are based on a liquid crystal device capable of performing full-color display in liquid crystal devices employing an FFS mode driving method, the invention can be equally applied to an IPS mode liquid crystal device.

FIG. 1 is an equivalent circuit diagram of a liquid crystal device 1 according to the present embodiment. In a plurality of sub-pixel areas which is formed in matrix and constitutes the image display area of the liquid crystal device 1, pixel electrodes 9 and thin film transistors (TFTs) 30 for controlling the switching of the pixel electrodes 9 are formed. A liquid crystal layer 50 is disposed between the pixel electrodes 9 and common electrodes 19. The common electrodes 19 are electrically connected to common lines 3b which extend from a scanning line-driving circuit 204 and are maintained at the same potential in a plurality of sub-pixels.

Data lines 6a which extend from a data line-driving circuit 201 are electrically connected to the sources of the TFTs 30. The data line-driving circuit 201 supplies image signals S1, S2, . . . , and Sn to the respective sub-pixels via data lines 6a. The image signals S1 to Sn may be supplied in this order in a line-sequential manner and may be supplied for each group of a plurality of neighboring data lines 6a.

Moreover, scanning lines 3a which extend from the scanning line-driving circuit 204 are electrically connected to the gates of the TFTs 30. Scanning signals G1, G2, . . . , and Gm are supplied in a pulsating manner at the predetermined time intervals from a scanning line-driving circuit 204 to the scanning lines 3a. The scanning signals G1 to Gm are applied in this order to the gates of the TFTs 30 in a line-sequential manner.

The pixel electrodes 9 are electrically connected to the drains of the TFTs 30. When the TFTs 30 which are switching elements are turned on for only a predetermined period of time in response to the input of the scanning signals G1, G2, . . . , and Gm, the image signals S1, S2, . . . , and Sn supplied from the data lines 6a are written to the pixel electrodes 9 at predetermined intervals of time. The image signals S1, S2, . . . , and Sn of a predetermined level, which have been written to the liquid crystal layer 50 via the pixel electrodes 9, are held for a predetermined period of time between the pixel electrodes 9 and the common electrodes 19 facing the pixel electrodes 9 with the liquid crystal layer 50 disposed therebetween.

Figure 2:
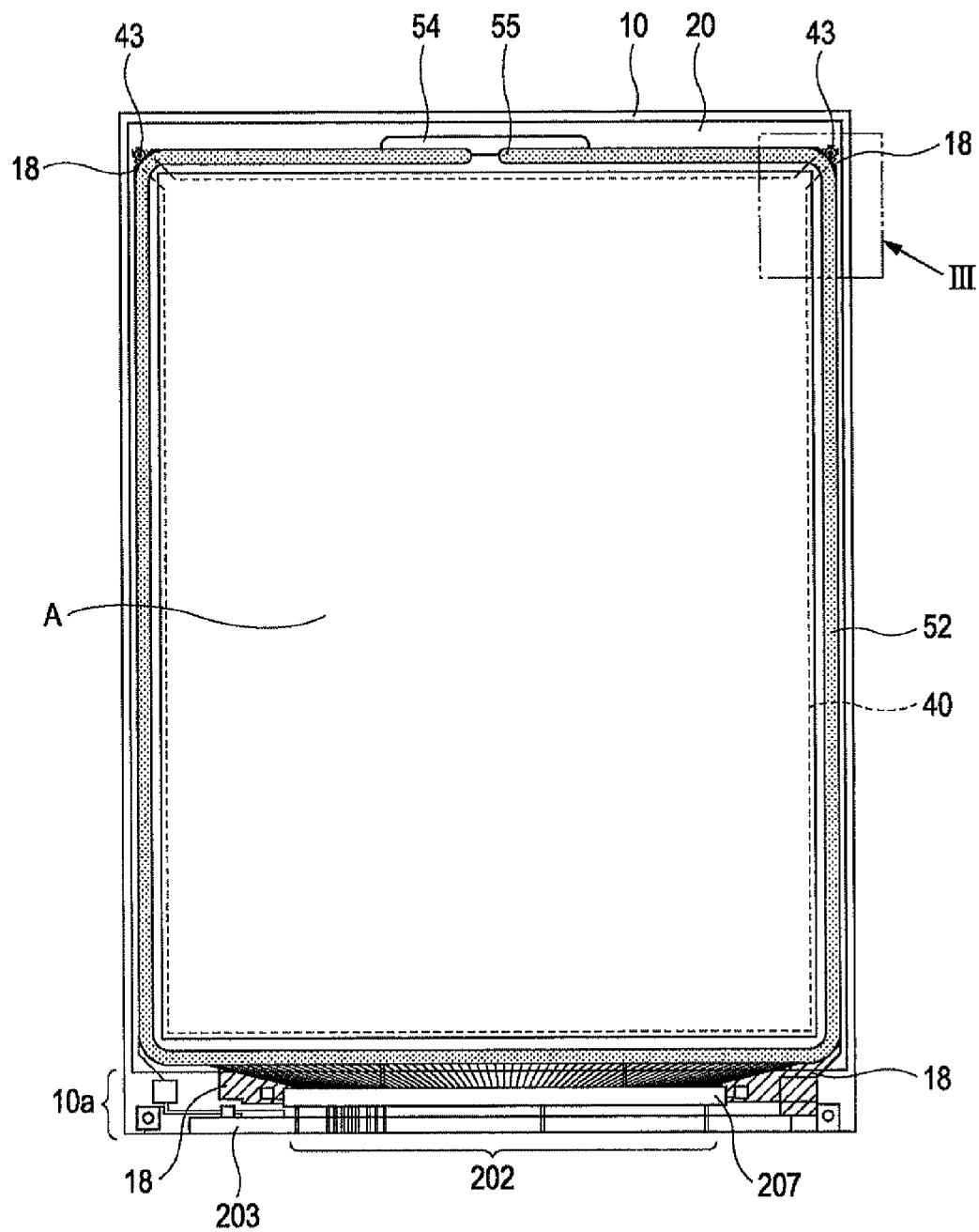
FIG. 2 is a plan view of the liquid crystal device according to the first embodiment, as viewed from the side of a counter substrate.
Figure 3:
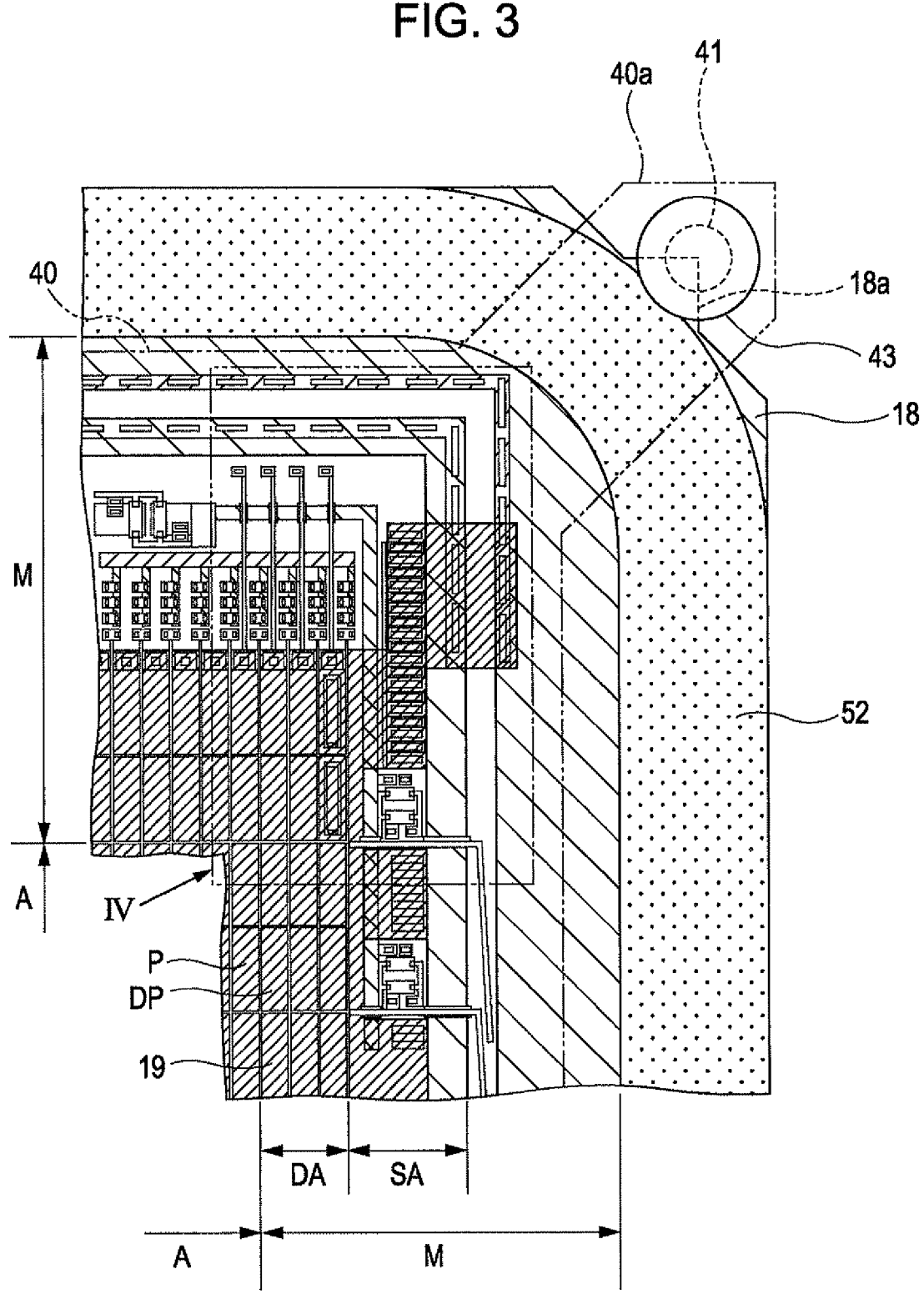
FIG. 3 is an enlarged view of a partial area in FIG. 2.
Figure 4:
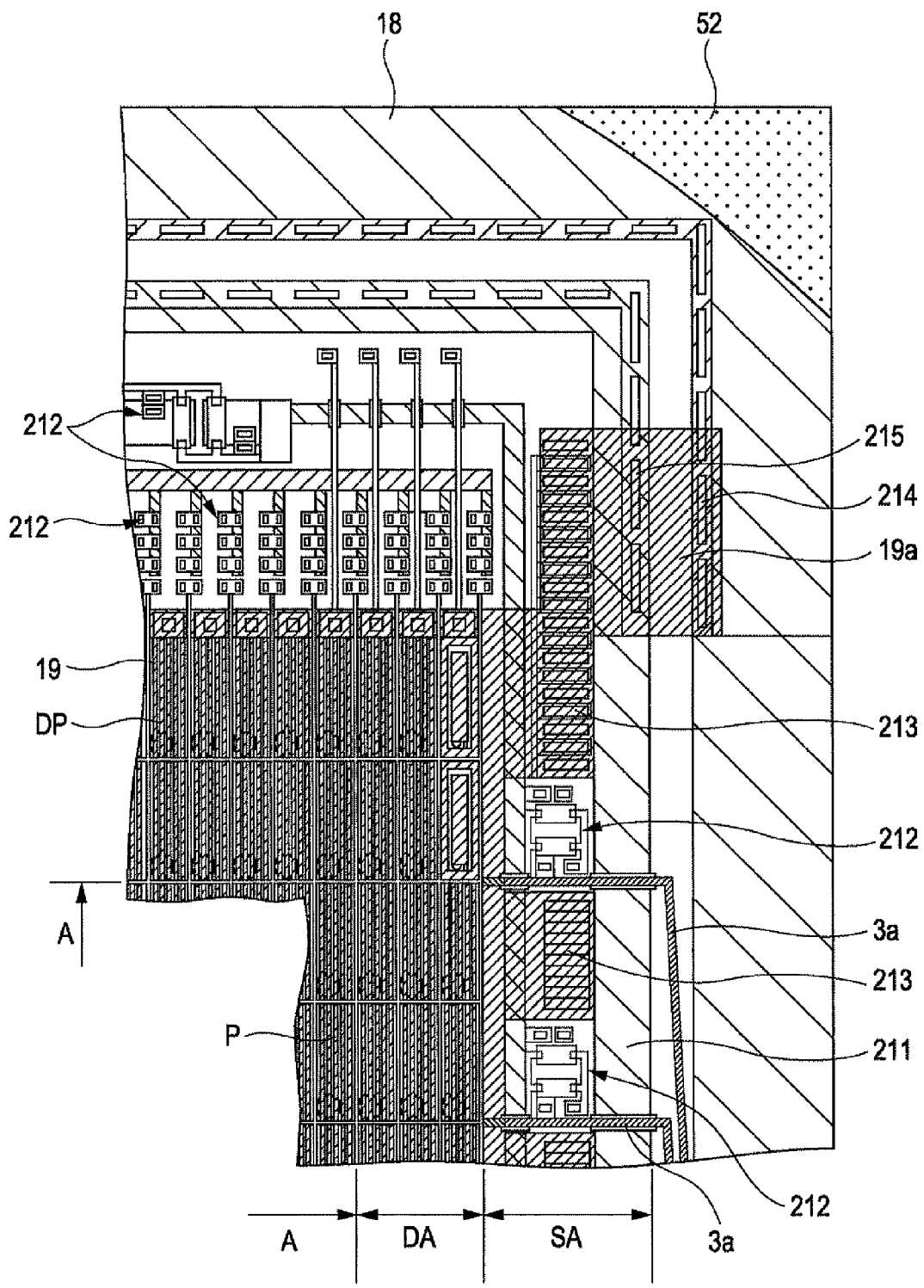
FIG. 4 is an enlarged view of a partial area in FIG. 3.

FIGS. 2 to 4 are plan views of the liquid crystal device 1 according to the present embodiment, as viewed from the side of a counter substrate (second substrate), in which FIG. 3 is an enlarged view of a partial area in FIG. 2, and FIG. 4 is an enlarged view of a partial area in FIG. 3.

As illustrated in FIG. 2, the liquid crystal device 1 according to the present embodiment has a configuration in which an element substrate (first substrate) 10 and a counter substrate (second substrate) 20 are bonded together by a sealing member 52 at the peripheral edge portion of a planarly overlapping portion, and liquid crystal molecules are filled and held in an area (display area A) defined by the sealing member 52. In the sealing member 52, a liquid crystal inlet 55 is formed for filling the liquid crystal molecules after the element substrate 10 and the counter substrate 20 are bonded together during the manufacturing steps, and the liquid crystal inlet 55 is sealed by a sealing material 54 after filling the liquid crystal molecules. In an area on the inner surface side of the element substrate 10 planarly overlapping with the display area A, non-illustrated pixel electrodes and common electrodes are formed. In an area on the inner surface side of the element substrate 10 planarly overlapping with the sealing member 52, drawing lines 18 are provided.

In a portion (substrate extension portion 10a) at one end side of the element substrate 10 extended from the overlapping portion of the element substrate 10 and the counter substrate 20, a driving IC 207 is mounted for processing driving signals for driving the liquid crystal device 1 and appropriately supplying the processed driving signals, and input terminals 202 are formed at the end portion of the driving IC 207. On the input terminals 202, an FPC (Flexible Printed Circuit) board having wirings formed thereon is mounted via an anisotropic conductive film 203, for example, so that an external power supply or various external devices can be connected thereto.

On the inner surface side of the counter substrate 20, a later-described electrostatic shielding layer 40 is provided so as to be electrically connected to the drawing lines 18 of the element substrate 10 via a conductive member 43 which is arranged in at least one of the corner portions of the counter substrate 20. In the liquid crystal device 1 according to the present embodiment, the conductive member 43 is provided at two locations: at both ends of the edge on the other side (the side facing the edge close to the driving IC 207) of the element substrate 10. In the liquid crystal device 1, other elements such as retardation plates and polarization plates, which are omitted in this disclosure, are arranged in a predetermined direction according to necessity.

FIG. 3 is an enlarged view of an area III surrounded by the two-dot chain line in FIG. 2. In this drawing, the configuration on the side of the element substrate 10 is mainly illustrated. As illustrated in the drawing, in the display area A, a plurality of, sub-pixels P, which have approximately a rectangular shape in a plan view, is arranged in a matrix so as to extend in vertical and lateral directions. Moreover, a non-display area M is defined around the display area A at the inner side of the sealing member 52. In the non-display area M, an electrostatic protection area SA is provided for discharging static electricity entering from the drawing lines 18 to protect the sub-pixels P arranged on the display area A, and a dummy area DA is provided which has arranged thereon dummy pixels (electrostatic protection members) DP for protecting the sub-pixels P due to them being destroyed by the static electricity which is not discharged in the electrostatic protection area SA.

In the element substrate 10 around the display area A, the drawing lines 18 are formed so as to overlap with the sealing member 52 and supply common potential to the common electrodes 19, and connecting portions 18a protruding to the outer side (sides opposite to the liquid crystal layer 50) are formed at corners where the drawing lines 18 are bent.

On the other hand, connecting portions 40a protruding to the outer side are formed at the corner portions of the electrostatic shielding layer 40 of the non-illustrated counter substrate. The connecting portions 40a and the connecting portions 18a planarly overlap with each other, and are formed to extend to the outer side of the sealing member 52 and are electrically connected via conductive members 43 at respective end portions. Therefore, the potential of the electrostatic shielding layer 40 is maintained at the same potential as the common potential.

FIG. 4 is an enlarged view of an area IV surrounded by the two-dot chain line in FIG. 3. As illustrated in the drawing, in the non-display area M (see FIG. 3), the dummy area DA is provided which has a plurality of dummy pixels DP arranged around the sub-pixels P, and the electrostatic protection area SA is provided which has short rings (electrostatic protection members) 211 or resistive elements (electrostatic protection members) 212 which are arranged in an area disposed between the dummy area DA and the sealing member 52. The short rings 211 and the resistive elements 212 on the electrostatic protection area SA are provided to protect the TFTs 30 arranged for each sub-pixel P from static electricity mainly generated during the manufacturing steps.

The static electricity generated during the manufacturing steps enters into the sub-pixels P from the outside of the display area A. Therefore, the generated static electricity is discharged by the function of the electrostatic protection area SA, and the sub-pixels P are prevented from being destroyed by the dummy pixels DP arranged in the dummy area DA which are destroyed by the static electricity which is not discharged.

The resistive elements 212 are provided so as to correspond to the rows and columns of the sub-pixels P and the dummy pixels DP and disposed at the end of each row and each column. In the drawing, the resistive elements 212 are alternately disposed for every one row of the sub-pixels P and the dummy pixels DP (on the even rows from the uppermost row) and are connected to the scanning lines 3a on respective rows. Although not illustrated, the resistive elements 212 corresponding to the remaining rows (odd rows) are also provided on the left edge facing the illustrated right edge. Moreover, the resistive elements 212 are also provided for each column at the upper ends of the columns of the sub-pixels P and the dummy pixels DP.

The common electrodes 19 are formed so as to cover the sub-pixels P and the dummy pixels DP, and extension portions 213 for connection to the short rings 211 are provided at the end portions thereof on the side where the resistive elements 212 are arranged. The extension portions 213 are disposed at positions where they do not overlap with the resistive elements 212, and the common electrodes 19 and the short rings 211 are connected via the extension portions 213.

In the extension portions 213 provided at the upper corner portions of the common electrodes 19, connecting portions 19a approximately having a rectangular shape in a plan view are provided for connection to the drawing lines 18, and the extension portions 213 and the connecting portions 19a are connected via a plurality of contact holes 214. Moreover, the connecting portions 19a are also connected to the short rings 211 via a plurality of contact holes 215. By these members provided on the electrostatic protection area SA, the electrostatic breakdown of the TFTs 30 provided in the sub-pixels P are prevented.

The electrostatic shielding layer 40 is provided so as to planarly overlap with each of the members of the dummy area DA and the electrostatic protection area SA. The electrostatic shielding layer 40 has a function for trapping external static electricity as described later and is thus able to prevent the respective members of the dummy area DA and the electrostatic protection area SA from being destroyed by the static electricity. Due to such a configuration, it is possible to effectively prevent the sub-pixels P from being destroyed in the dummy area DA and the electrostatic protection area SA. Moreover, since the electrostatic shielding layer 40 is electrically connected to the respective members of the dummy area DA and the electrostatic protection area SA, they are able to cooperation in the diffusion of the static electricity.

Figure 6:
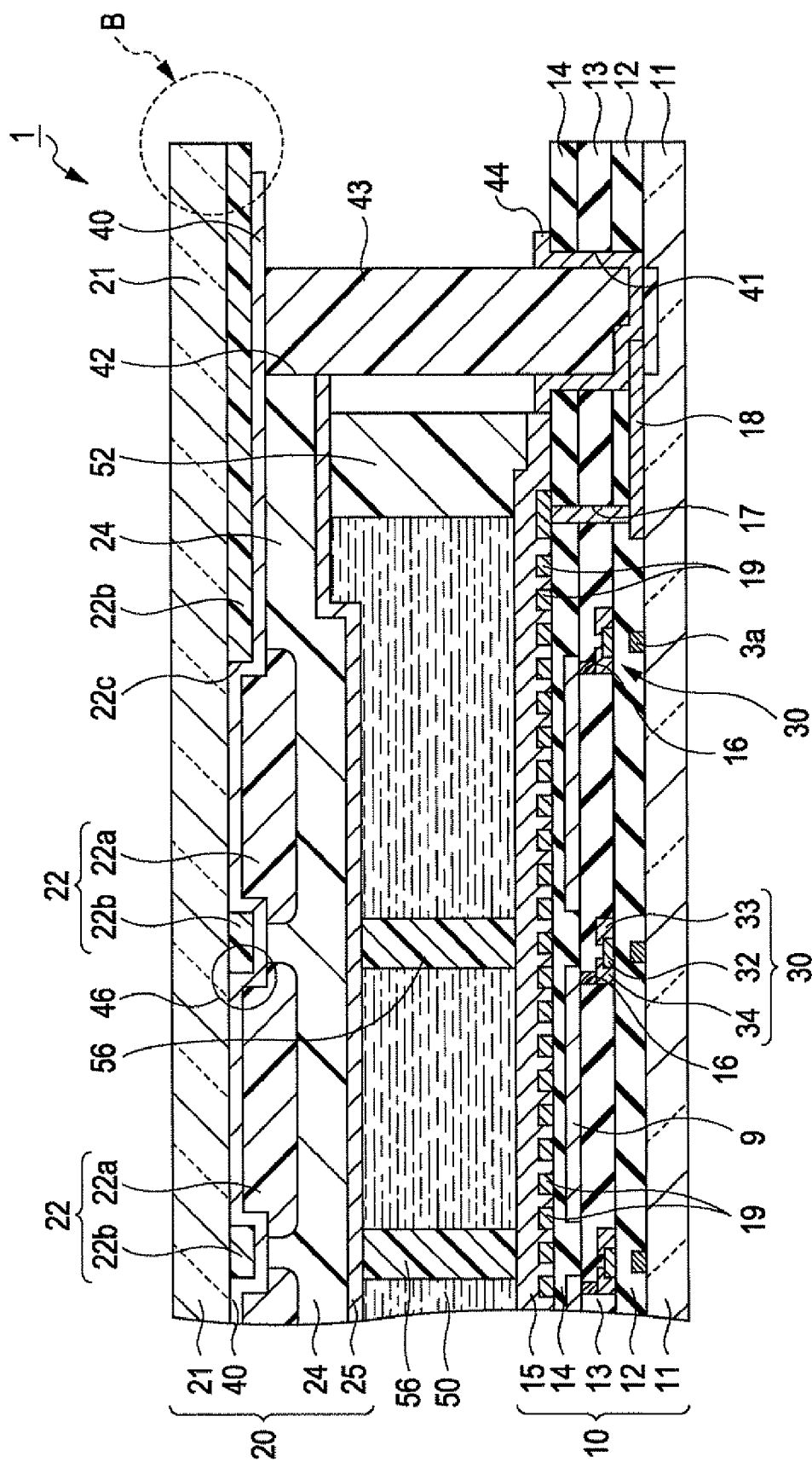
FIG. 6 is a simplified cross-sectional view of the liquid crystal device according to the first embodiment.

FIG. 6 is a simplified cross-sectional view of the peripheral portions of the sealing member 52 and the conductive member 43 of the liquid crystal device 1 according to the present embodiment. In this drawing, the configurations of the non-display area are not illustrated to enable better understanding of the drawing.

As illustrated in the drawing, the liquid crystal device 1 is configured to include the element substrate 10, the counter substrate 20 disposed to face the element substrate 10, and the liquid crystal layer 50 sandwiched between the element substrate 10 and the counter substrate 20. Moreover, the sealing member 52 is provided to the liquid crystal device 1 along the edge of an area where the element substrate 10 and the counter substrate 20 face each other, and the liquid crystal molecules constituting the liquid crystal layer 50 are sealed in the sealing member 52. The liquid crystal device 1 has such a configuration that illumination light is irradiated from the side of the element substrate 10, and displayed images are observed from the side of the counter substrate 20.

In the following descriptions, the side of the element substrate 10 (or element substrate body 11) disposed close to the liquid crystal layer 50 will be referred to as "top" or "top surface." Similarly, the side of the counter substrate 20 (or counter substrate body 21) disposed close to the liquid crystal layer 50 will be referred to as "top" or "top surface."

The element substrate 10 includes an element substrate body 11 having transparent properties. As materials for forming the element substrate body 11, inorganic materials such as glass, quartz glass, or silicon nitrides or organic polymeric compounds (resin) such as acrylic resin or polycarbonate resin can be used. Moreover, composite materials obtained by laminating or mixing such materials may be used if they have transparent properties.

On the element substrate body 11, the scanning lines 3a and the non-illustrated data lines which are formed of conductive materials such as aluminum or copper are formed. In an area planarly overlapping with the sealing member 52, the drawing lines 18 similarly of the like conductive materials are formed. These lines may be formed of the same materials and may be formed of different materials. These lines can be obtained by forming a thin film of conductive materials and then patterning the thin film, for example. In the present embodiment, aluminum is used as the forming material.

On the element substrate body 11, a gate insulating film 12 is formed so as to cover the scanning lines 3a, the data lines, and the drawing lines 18. The insulating film 12 is formed of transparent materials with insulating properties such as silicon nitrides or silicon oxides.

On the gate insulating film 12, a semiconductor layer 32, a source electrode 33 connected to one end of the semiconductor layer 32, and a drain electrode 34 connected to the other end of the semiconductor layer 32 are formed, whereby a bottom-gate type TFT 30 is constructed by the semiconductor layer 32, the source electrode 33, the drain electrode 34, and the scanning line 3a. Moreover, an interlayer insulating film 13 is formed so as to cover the TFTs 30. The interlayer insulating film 13 is formed of transparent materials with insulating properties such as silicon nitrides or silicon oxides, similar to the gate insulating film 12.

The pixel electrodes 9 are formed on the interlayer insulating film 13 and are electrically connected to the drain electrodes 34 of the TFTs 30 via contact holes 16. The pixel electrodes 9 are formed of conductive materials with transparent properties such as ITO (Indium Tin Oxide) or tin oxides ($SnO_2$). In the present embodiment, ITO is used.

On the interlayer insulating film 13, an inter-electrode insulating film 14 is formed so as to cover the pixel electrodes 9. The inter-electrode insulating film 14 is formed of transparent materials with insulating properties such as silicon nitrides or silicon oxides, similar to the gate insulating film 12 and the interlayer insulating film 13, and is configured to cover the pixel electrodes 9 formed on the interlayer insulating film 13.

Ladder-shaped common electrodes 19 are formed on the inter-electrode insulating film 14. The pixel electrodes 9 and the common electrodes 19 are disposed with the inter-electrode insulating film 14 disposed therebetween, thereby constructing an FFS mode electrode structure. The common electrodes 19 are connected to the drawing lines 18 via contact holes 17 which pass through the gate insulating film 12, the interlayer insulating film 13, and the inter-electrode insulating film 14. The common electrodes 19 are formed of conductive materials with transparent properties such as ITO, and ITO is used as the material of the common electrodes 19 in the present embodiment.

On the interelectrode insulating film 14, a first alignment film 15 is formed so as to cover the common electrodes 19. The first alignment film 15 is formed of organic materials such as polyimide or inorganic materials such as, for example, silicon oxides. The first alignment film 15 according to the present embodiment can be obtained by applying a material for forming polyimide, drying and curing the material, and then applying a rubbing process on the upper surface thereof.

On the other hand, the counter substrate 20 includes a counter substrate body 21 having transparent properties. The counter substrate body 21 can be formed of the same material as the element substrate body 11.

On the counter substrate body 21, a light shielding layer 22b, an electrostatic shielding layer 40, a coloring layer 22a, an overcoat layer 24, and a second alignment film 25 are formed in this order. The light shielding layer 22b and the coloring layer 22a constitute a color filter layer 22. The light shielding layer 22b is formed by patterning an acrylic resin layer having a black pigment mixed therein, formed on the entire surface of the counter substrate body 21 by a photolithographic method. The patterning is performed so that the resin layer has a grid shape in the display area A (see FIG. 2) so as to surround an opening 22c. The area of the opening 22c in a plan view corresponds to the area of the sub-pixels P (see FIG. 3) in a plan view. On the surface of the electrostatic shielding layer 40, uneven structures resembling the shape of the light shielding layer 22b which serves as an underlying layer are formed. The uneven structures are uneven portions 46.

The electrostatic shielding layer 40 is formed so as to cover the display area A, the dummy area DA, and the electrostatic protection area SA illustrated in FIG. 3. Therefore, the opening 22c in the display area A remains on the upper surface of the electrostatic shielding layer 40 as a concave portion (trench) approximately having the same shape in a plan view. The coloring layer 22a is formed by applying the forming material of the coloring layer 22a in the concave portion via the electrostatic shielding layer 40 using a wet-etching method such as an ink-droplet ejection method.

In the color filter layer 22 of the liquid crystal device 1 of the present embodiment, the thickness of the coloring layer 22a is 2 μm, and the thickness of the light shielding layer 22b is 1.5 μm. The color filter layer 22 modulates light entered from the side of the element substrate 10 and emitted to the side of the counter substrate 20 into red light, green light, and blue light, and mixes the light of the respective colors, thereby enabling full-color display.

The electrostatic shielding layer 40 is provided to trap external static electricity and release the trapped static electricity to later-described conductive members 43, thereby preventing an unexpected vertical electric field from being generated between the counter substrate 20 and the element substrate 10. The electrostatic shielding layer 40 is formed of conductive materials with transparent properties such as ITO or $SnO_2$, and in the present embodiment, ITO is used.

The electrostatic shielding layer 40 of the liquid crystal device 1 according to the present embodiment is formed by a mask deposition method which is one of the mask film forming methods. That is to say, patterning is performed without using a photolithographic method during the film forming step. Therefore, unlike the liquid crystal device 3 according to the comparative example, the electrostatic shielding layer 40 is not formed on the entire surface of the counter substrate body 21. Specifically, at the end portion B of the counter substrate 20, the end face of the electrostatic shielding layer 40 is positioned slightly at the inner side than the end face of the counter substrate body 21. That is to say, at the end portion B of the counter substrate 20, the end face of the electrostatic shielding layer 40 is not even with the end face of the counter substrate body 21. Due to such a shape, the above-described phenomenon, namely entering of static electricity and corrosion of the electrostatic shielding layer 40 can be suppressed.

Here, in order to perform the mask deposition method, an alignment mark for carrying out the positioning of a deposition mask is necessary. Therefore, as illustrated in the comparative example of FIG. 5, the mask deposition cannot be performed when the electrostatic shielding layer 40 is formed directly on the counter substrate body 21. In the liquid crystal device 1 according to the present embodiment, the light shielding layer 22b is formed between the counter substrate body 21 and the electrostatic shielding layer 40. That is to say, the electrostatic shielding layer 40 is formed after the light shielding layer 22b is formed and patterned on the counter substrate body 21. Therefore, an alignment mark can be formed during patterning of the light shielding layer 22b, and the electrostatic shielding layer 40 can be deposited by a mask deposition method using the alignment mark. That is to say, since the liquid crystal device 1 according to the present embodiment has the electrostatic shielding layer 40 which is formed on the counter substrate body 21 via the light shielding layer 22b, the electrostatic shielding layer 40 can be formed by a mask deposition method, thereby improving the reliability. The description will be continued below.

The overcoat layer 24 is formed on the upper surface of the coloring layer 22a and the electrostatic shielding layer 40. The overcoat layer 24 has a function of physically and chemically protecting the coloring layer 22a and the electrostatic shielding layer 40. The overcoat layer 24 also prevents low molecular materials or ionic impurities such as reaction residues from the curing agent contained in the respective forming materials from being liquidated from the formed coloring layer 22a into the liquid crystal layer 50, thus preventing display irregularities. The overcoat layer 24 is formed of curable resin having transparent properties such as, for example, acrylic resin or epoxy resin. In the liquid crystal device 1 according to the present embodiment, acrylic resin is used and the overcoat layer 24 has a thickness of 2 μm.

On the overcoat layer 24, a second alignment film 25 is formed of the same material as the first alignment film 15. The second alignment film 25 according to the present embodiment can be obtained by applying a material for forming polyimide, drying and curing the material, and then applying a rubbing process on the upper surface thereof in a predetermined direction. The alignment direction of the second alignment film 25 during the rubbing process is set to be identical to the alignment direction of the first alignment film 15.

On areas of the overcoat layer 24 overlapping with the liquid crystal layer 50, spacers 56 are formed in areas overlapping with the light shielding layer 22b. The spacers 56 are provided to maintain a constant separation distance between the element substrate 10 and the counter substrate 20. For instance, even when stress is applied from the side of the counter substrate 20, since the thickness of the liquid crystal layer 50 won't become smaller than the height of the spacers 56; it is possible to prevent display irregularities.

The drawing lines 18 provided on the element substrate 10 and the electrostatic shielding layer 40 provided on the counter substrate 20 are electrically connected via the conductive members 43 in an area outside (side opposite to the liquid crystal layer 50) of the sealing member 52 surrounding the liquid crystal layer 50. The conductive members 43 are formed of curable resin having conductive fine particles mixed therein, silver pastes, or the like. The conductive fine particles may be fine metal particles of Au or Ag, non-conductive fine particles coated with conductive materials such as metal, or the like.

On areas of the element substrate 10 where the conductive members 43 are arranged, the contact holes 41 are formed so as to pass through the gate insulating film 12, the interlayer insulating film 13, and the inter-electrode insulating film 14, and the drawing lines 18 are partially exposed to the bottom portion thereof.

Since the drawing lines 18 according to the present embodiment are formed of aluminum which is base material, when they are exposed through the contact holes 41, the surfaces thereof may be oxidized to form an oxide film thereon, so that there are concerns that it might be unable to realize an electrical connection. Moreover, since only portions of the drawing lines 18 are exposed to the bottom portions of the contact holes 41, the contact surface area with the conductive members 43 is small. Therefore, in order to prevent the surface oxidation of the drawing lines 18 and realize a reliable electrical connection to the conductive members 43, it is preferable to form a conductive film 44 formed of ITO or $SnO_2$ so as to cover the contact holes 41.

Moreover, on areas of the counter substrate 20 where the conductive members 43 are arranged contact holes 42 are formed so as to pass through the overcoat layer 24.

The liquid crystal device 1 according to the present embodiment has the above-mentioned configuration.

In the liquid crystal device 1 having the above-mentioned configuration, the coloring layer 22a and the overcoat layer 24 are provided between the electrostatic shielding layer 40 and the second alignment film 25, and the electrostatic shielding layer 40 and the liquid crystal layer 50 are spaced apart by the thickness of these layers. Due to such a configuration, compared to the case of forming the electrostatic shielding layer 40 in contact with the second alignment film 25, the coulomb force of the static electricity trapped in the electrostatic shielding layer 40 is weakened and thus can hardly affect the liquid crystal layer 50. Moreover, since the separation distance is prepared using the coloring layer 22a and the overcoat layer 24 in a liquid crystal device capable of displaying color images, it is not necessary to provide any new insulating layers in order to prepare the separation distance. Therefore, compared to the liquid crystal device where the electrostatic shielding layer 40 is formed between the overcoat layer 24 and the second alignment film 25, it is possible to effectively suppress further display irregularities resulting from the static electricity and realize high-quality image display.

Moreover, the uneven portions 46 formed on the surface of the electrostatic shielding layer 40 function as a lightning conductor to the external static electricity. Therefore, the external static electricity can be easily trapped compared to the case where the electrostatic shielding layer 40 having a flat surface shape is formed directly on the counter substrate body 21. Due to such a configuration, the electrostatic shielding layer 40 has an excellent shielding effect, and thus, the irregularities in images due to the influence of static electricity can be more effectively suppressed and high-quality image display can be realized.

Moreover, the liquid crystal device 1 according to the present embodiment has such a configuration that the drawing lines 18 and the electrostatic shielding layer 40 are electrically connected at positions where they overlap with each other in a plan view via the conductive members 43, and the potential of the electrostatic shielding layer 40 is controlled to be at the same potential as the common electrodes 19, controlled by the driving circuit. Due to such a configuration, since the charges of the static electricity trapped in the electrostatic shielding layer 40 can be maintained at the same level as the common potential, the static electricity is not accumulated or increased even after a long period of use. Moreover, since the electrostatic shielding layer 40 is connected to the drawing lines 18, it is possible to discharge the charges accumulated in the electrostatic shielding layer 40 without needing to form any new conductive constituent member. Furthermore, since there is no potential difference between the electrostatic shielding layer 40 and the common electrodes 19, a vertical electric field can hardly be generated between the substrates, and accordingly, the liquid crystal device 1 capable of suppressing the irregularities in images can be provided.

Figure 5:
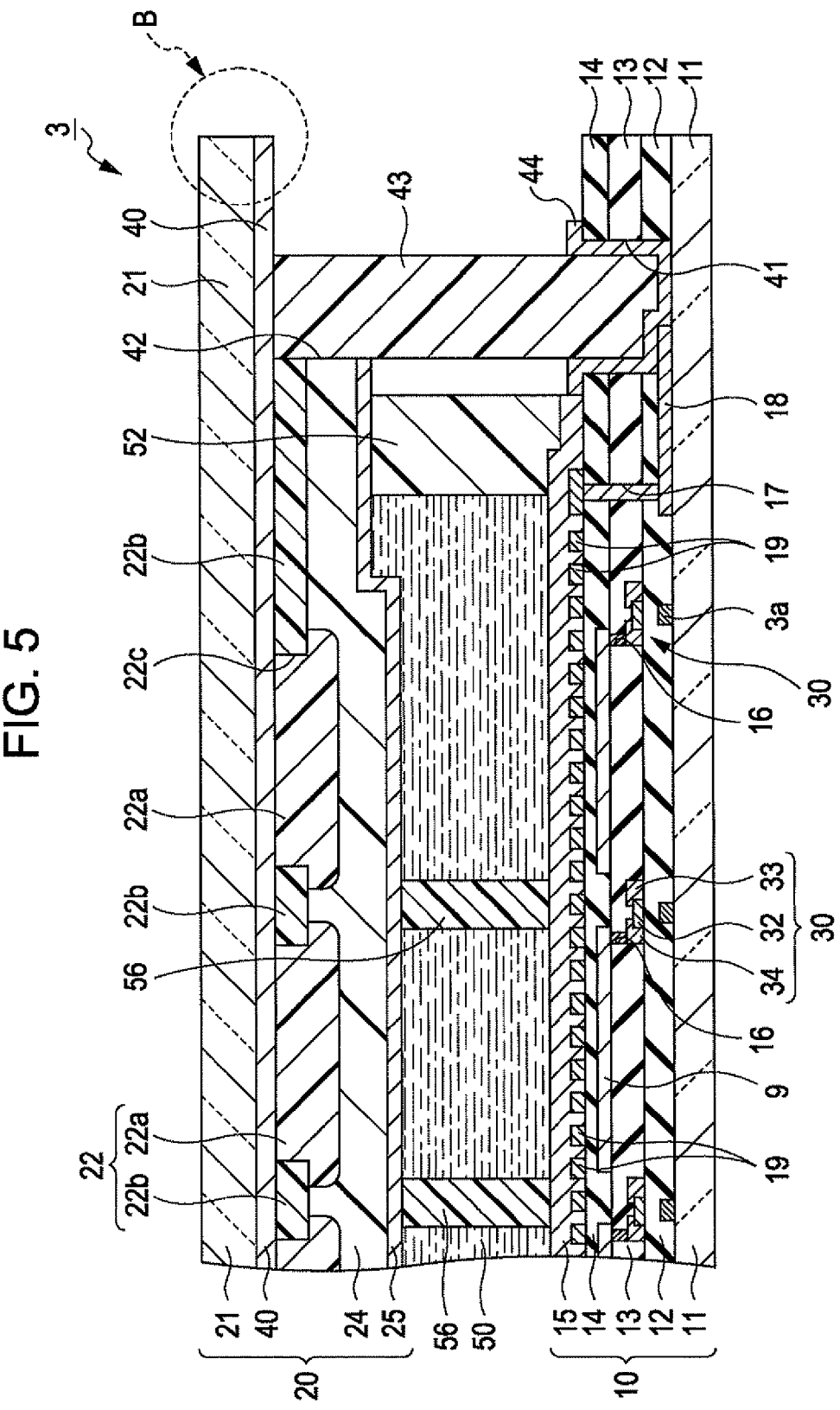
FIG. 5 is a simplified cross-sectional view of a liquid crystal device according to a comparative example.

The liquid crystal device 1 according to the present embodiment is different from the liquid crystal device according to the comparative example illustrated in FIG. 5, in that the light shielding layer 22b is also formed, in addition to the electrostatic shielding layer 40, between the conductive members 43 and the counter substrate body 21. Due to such a configuration, the height (a dimension in the vertical direction of the substrate plane) of the conductive members 43 is reduced by an amount of the thickness of the light shielding layer 22b. Therefore, the diameter of the conductive fine particles (for example, metal fine particles of Au or Ag) contained in the conductive members 43 is also reduced. As a result, even when the particles are misaligned to be positioned on the overcoat layer 24, the influence of the misalignment on the inter-substrate distance (the gap between the counter substrate 20 and the element substrate 10) can be decreased. Accordingly, compared to the liquid crystal device according to the comparative example, the display quality and the reliability can be improved.

The pixel electrodes 9 of the liquid crystal device 1 according to the present embodiment are provided on the opposite side of the liquid crystal layer 50 with the common electrodes 19 disposed therebetween. Due to such a configuration, the electrostatic shielding layer 40 for trapping static electricity can be more spaced apart from the pixel electrodes 9, and the electric field generated between the pixel electrodes 9 and the electrostatic shielding layer 40 can be suppressed to a weaker level, whereby the liquid crystal device 1 capable of suppressing the irregularities in images can be provided.

In the present embodiment, although the electrostatic shielding layer 40 is electrically connected to the drawing lines 18, the electrostatic shielding layer 40 may be in an electrically isolated floating state. The floating state refers to a state where the electrostatic shielding layer 40 is formed in a state of being electrically isolated from peripheral conductive members such as wirings or electrodes.

Moreover, in the present embodiment, although the electrostatic shielding layer 40 is electrically connected to the drawing lines 18, the invention is not limited to this. For example, the common electrodes 19 may be formed so as to extend to the outside of the sealing member 52 so that the electrostatic shielding layer 40 is electrically connected to the common electrodes 19. Moreover, an additional conduction member may be provided for discharging static electricity to the electrostatic shielding layer 40.

Furthermore, in the present embodiment, although the electrostatic shielding layer 40 is connected to the common electrodes 19 so as to be controlled at the common potential, the invention is not limited to this. For example, additional wirings maintained at the GND potential may be formed, and the electrostatic shielding layer 40 may be connected to the wirings, so that the electrostatic shielding layer 40 is maintained at the GND potential.

Furthermore, the pixel electrodes 9 may be arranged closer to the side of the liquid crystal layer 50 than the common electrodes 19. In such a case, the pixel electrodes 9 arranged closer to the liquid crystal layer 50 are configured into ladder-shaped electrodes.

Second Embodiment

Figure 7:
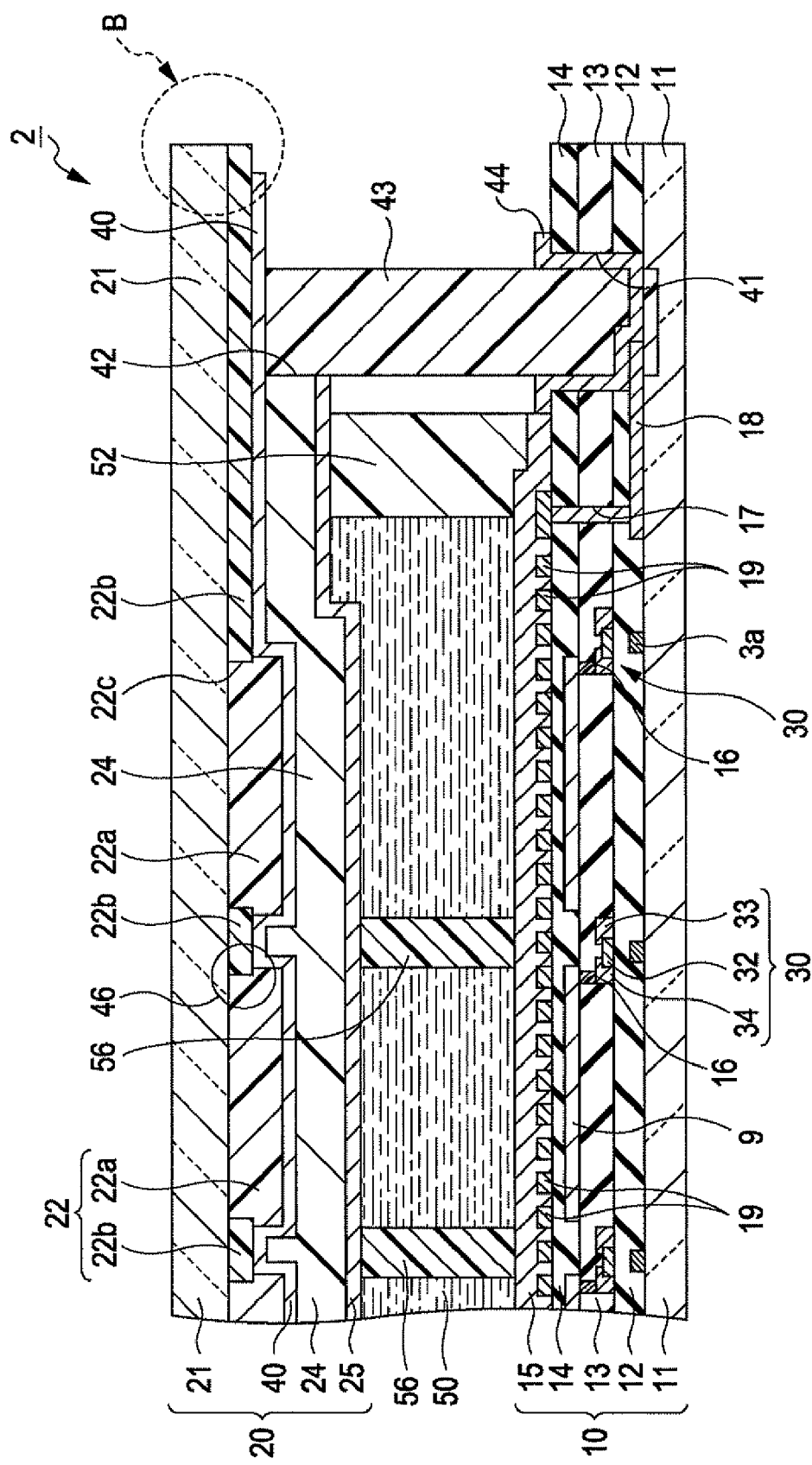
FIG. 7 is a simplified cross-sectional view of a liquid crystal device according to a second embodiment of the invention.

Next, a liquid crystal device 2 according to a second embodiment of the invention will be described. FIG. 7 is a simplified cross-sectional view of the liquid crystal device 2 according to the second embodiment of the invention, which corresponds to FIG. 6 in the first embodiment. Therefore, the configurations of the non-display area are not illustrated.

The liquid crystal device 2 according to the present embodiment has a similar configuration to the liquid crystal device 1 according to the first embodiment, except that the light shielding layer 22b, the coloring layer 22a, and the electrostatic shielding layer 40 are arranged differently on the counter substrate 20. In the descriptions of the present embodiment, drawings corresponding to FIGS. 1 to 4 are omitted. Moreover, the same constituent elements as those of the liquid crystal device 1 will be denoted by the same reference numerals, and the detailed descriptions thereof will be appropriately omitted.

As illustrated in the drawing, the electrostatic shielding layer 40 of the liquid crystal device 2 is formed on the coloring layer 22a, namely between the coloring layer 22a and the overcoat layer 24. Similar to the electrostatic shielding layer 40 of the liquid crystal device 1 according to the first embodiment, the end face of the electrostatic shielding layer 40 of the liquid crystal device 2 is not even with the end face of the counter substrate body 21 at the end portion B of the counter substrate, but is formed slightly at the inner side. Therefore, the liquid crystal device 2 according to the present embodiment can provide the same advantages as those of the liquid crystal device 1 (compared to the liquid crystal device according to the comparative example).

That is to say, in the liquid crystal device 2, the entering of static electricity and the corrosion of the electrostatic shielding layer 40 are suppressed, and the reliability is improved. Moreover, Due to the uneven portions 46 formed on the surface of the electrostatic shielding layer 40, the irregularities in images due to the influence of the static electricity can be more effectively suppressed. Furthermore, since the diameter of the conductive fine particles contained in the conductive members 43 can be reduced, the display quality and the reliability can be improved.

Furthermore, since the liquid crystal device 2 has the electrostatic shielding layer 40 which is formed between the coloring layer 22a and the overcoat layer 24, unlike the liquid crystal device 1, the following advantages can be provided.

The first advantage relates to design of the liquid crystal device. Since the liquid crystal device 2 has the coloring layer 22a which is not formed on the surface of the electrostatic shielding layer 40 disposed close to the liquid crystal layer 50, but on the surface of the electrostatic shielding layer 40 disposed close to the counter substrate body 21, the distance between the electrostatic shielding layer 40 and the liquid crystal layer 50 is not affected by the thickness of the coloring layer 22a. Therefore, since only the difference lies in the thickness of the coloring layer 22a, other configurations can be formed by a series of the same liquid crystal device manufacturing steps, the cost (and time) required for designing can be reduced.

The second advantage is that it is possible to reduce the liquation of the impurities from the coloring layer 22a. As described above, the liquation is suppressed by the overcoat layer 24 in the liquid crystal device 1 according to the first embodiment. In the liquid crystal device 2 according to the present embodiment, since the electrostatic shielding layer 40 is further disposed between the coloring layer 22a and the overcoat layer 24, the liquation can be suppressed more certainly. Therefore, the reliability is further improved.

Third Embodiment

Next, a method of manufacturing the liquid crystal device according to a third embodiment of the invention will be described. FIGS. 9A to 9D are cross-sectional views illustrating the process steps of the liquid crystal device manufacturing method according to the third embodiment of the invention. The manufacturing method according to the present embodiment relates to the process steps for forming the electrostatic shielding layer. Therefore, only the constituent elements necessary for the present embodiment such as the counter substrate body 21 will be illustrated and other constituent elements will not be illustrated. The respective steps will be described below.

The manufacturing method according to the present embodiment will be illustrated with respect to the case of simultaneously forming a plurality of liquid crystal devices using a large-format (large-area) substrate.

Figure 9A:
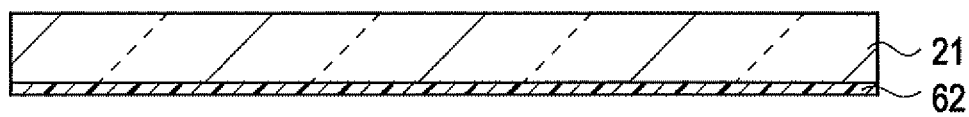
FIGS. 9A to 9D are cross-sectional views illustrating the process steps of a liquid crystal device manufacturing method according to a third embodiment of the invention.

First, as illustrated in FIG. 9A, a light shielding material layer 62 is formed on the entire upper surface of the counter substrate body 21. The light shielding material may be acrylic resin having a black pigment mixed therein as described above.

Figure 9B:
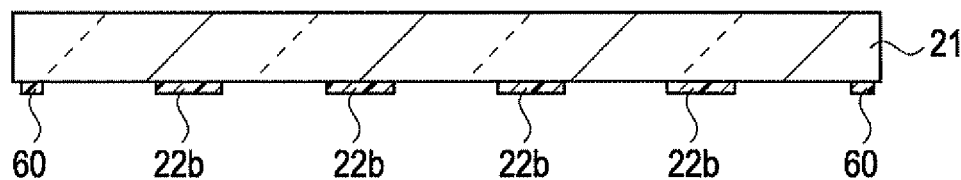

Next, as illustrated in FIG. 9B, the light shielding material layer 62 is patterned to form the light shielding layer 22b. The patterning is preferably performed by a photolithographic method. As described above, the counter substrate body 21 is a large-format substrate and a plurality of liquid crystal devices is simultaneously formed using the substrate. Therefore, the individual light shielding layer 22b in this drawing corresponds to the light shielding layer 22b per one liquid crystal device. In other words, the individual light shielding layer 22b illustrated in this drawing has a non-illustrated grid-shaped pattern. Openings (not illustrated) are defined in areas surrounded by the grid-shaped pattern. Moreover, alignment marks 60 are formed at the outer side of the display area A (see FIG. 2) during the patterning. Such a fine pattern can be formed by using a photolithographic method.

Figure 9C:
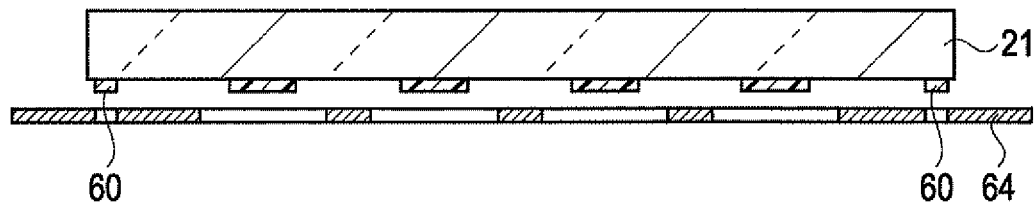

Next, as illustrated in FIG. 9C, a deposition mask 64 as a film forming mask is disposed on the counter substrate body 21, and then, alignment (positioning) is carried out using the alignment marks 60. Although the counter substrate body 21 and the deposition mask 64 are slightly spaced apart from each other in the drawing, they may be in close contact.

Figure 9D:
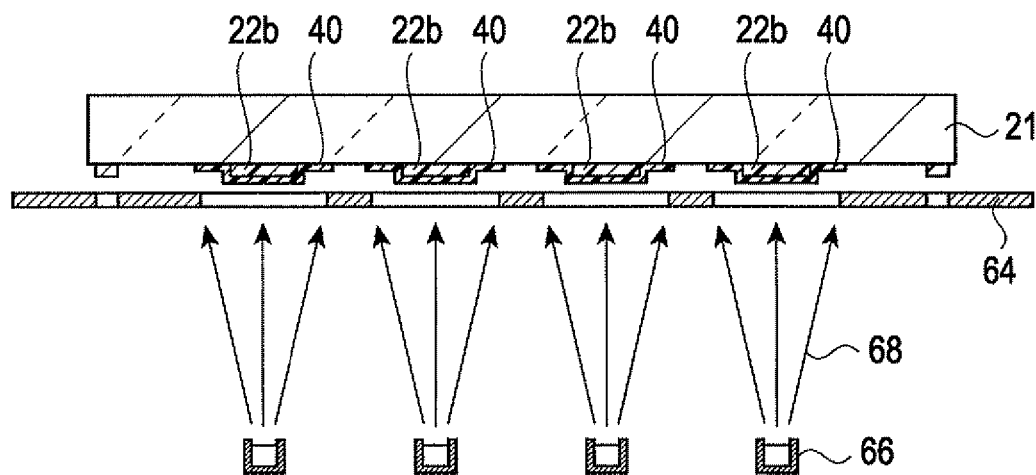

Next, as illustrated in FIG. 9D, the counter substrate body 21 is disposed to face a crucible 66 having a non-illustrated heat source. Then, ITO particles 68 as transparent conductive material particles are scattered over the deposition mask, thereby forming the electrostatic shielding layer 40 so as to cover the light shielding layer 22b.

As illustrated in the drawing, a plurality of electrostatic shielding layers 40 is formed on the counter substrate body 21 with gaps defined between them. The gaps correspond to division positions (positions serving as division lines) which are used for dividing the counter substrate body 21 to obtain the individual liquid crystal devices. Due to the presence of the gaps, the end face of the counter substrate body 21 is prevented from being even with the end face of the electrostatic shielding layer 40 in the divided liquid crystal device. Due to such a configuration, the corrosion of the electrostatic shielding layer or the entering of the static electricity can be suppressed. According to the manufacturing method of the present embodiment, it is possible to obtain a liquid crystal device having an improved display quality and an improved reliability.

Electronic Apparatus

Figure 8:
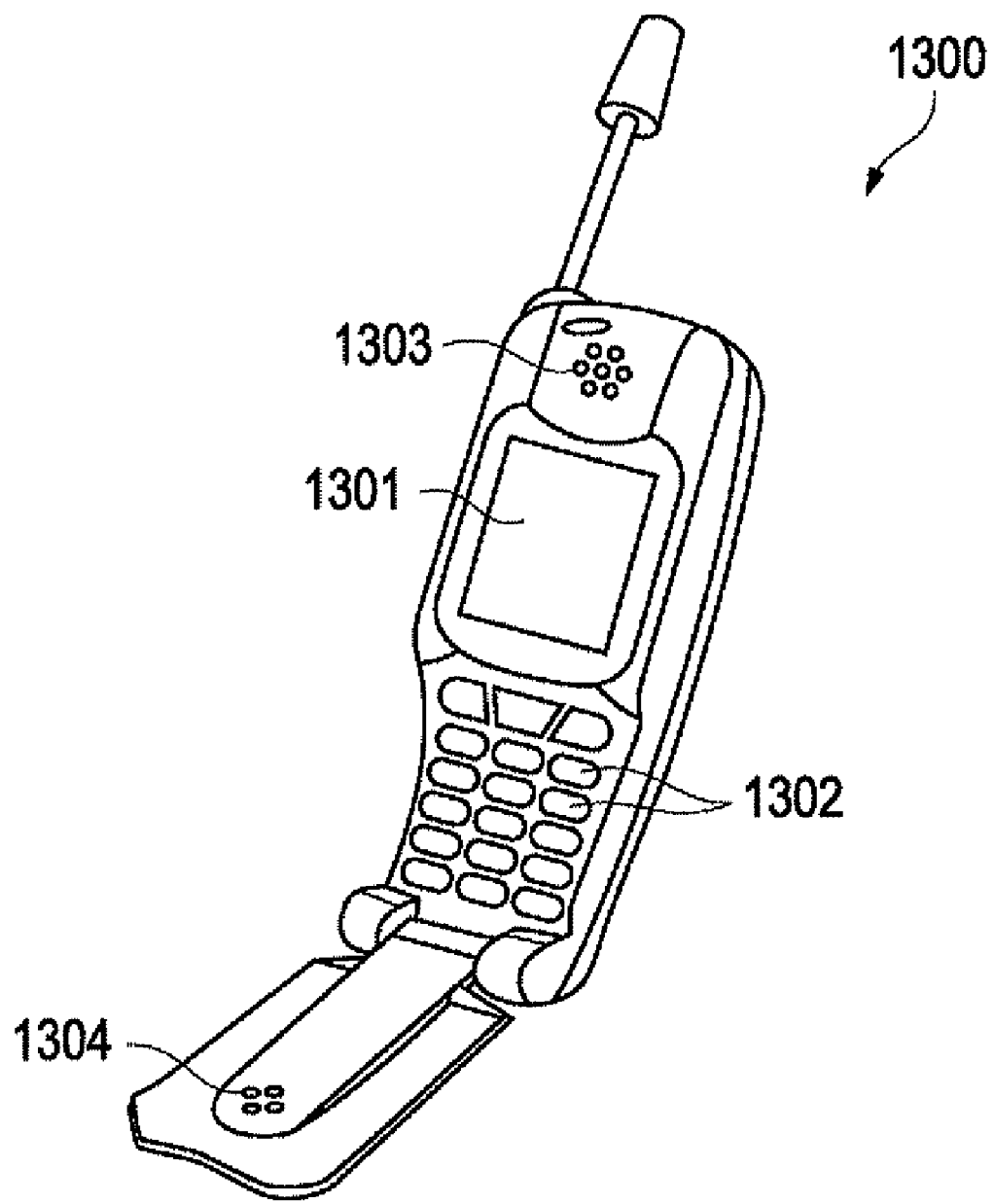
FIG. 8 is a perspective view illustrating an example of an electronic apparatus according to the invention.

Next, an embodiment of an electronic apparatus according to the invention will be described. FIG. 8 is a perspective view illustrating an example of an electronic apparatus according to the invention. The cellular phone (electronic apparatus) 1300 illustrated in FIG. 8 includes a small-sized display portion 1301 as the liquid crystal device of the invention, a plurality of operation buttons 1302, an ear piece 1303, and a mouth piece 1304. Therefore, it is possible to provide the cellular phone 1300 having the display portion which is constructed by the liquid crystal device according to the invention and is thus capable of suppressing display irregularities due to static electricity.

The liquid crystal device according to the respective embodiments is not limited to the cellular phone. The liquid crystal device may be suitably used as an image display unit of an electronic book, a projector, a personal computer, a digital-still camera, a television receiver, a view finder type or monitor direct vision-type video tape recorder, a car navigation apparatus, a pager, an electronic pocket book, a calculator, a word processor, a work station, a television phone, a POS terminal, and an apparatus having a touch panel. By having such a configuration, it is possible to provide an electronic apparatus having a display portion capable of reducing the irregularities in images due to static electricity and providing high display quality.

Although the exemplary embodiments of the invention have been described with reference to the accompanying drawings, it should be understood that the invention is not limited to such embodiments. Various shapes or combinations of respective constituent elements illustrated in the above-described embodiments are merely examples, and various changes may be made depending on design requirements or the like without departing from the spirit or the scope of the invention.

The entire disclosure of Japanese Patent Application Nos. 2008-252585, filed Sep. 30, 2008 and 2009-133778, Jun. 3, 2009 are expressly incorporated by reference herein.

What is claimed is:

1. A lateral electric field mode liquid crystal device comprising:
   a first substrate;
   a second substrate;
   a liquid crystal layer sandwiched between the first substrate and the second substrate; and
   pixel electrodes and common electrodes which are formed on a surface of the first substrate disposed close to the liquid crystal layer, the lateral electric field mode liquid crystal device driving the liquid crystal layer by an electric field generated between the pixel electrodes and the common electrodes,
   wherein on a surface of the second substrate disposed close to the liquid crystal layer, a light shielding layer which is formed in areas including an area disposed between the pixel electrodes in a plan view and is capable of absorbing at least visible light, a coloring layer which is formed so as to overlap with the pixel electrodes in a plan view and is capable of transmitting light in a particular wavelength range, an overcoat layer for protecting the coloring layer, and an alignment film are formed in this order, and
   wherein an electrostatic shielding layer formed of a transparent conductive material is formed on a surface of the overcoat layer disposed close to the second substrate and a surface of the light shielding layer disposed close to the liquid crystal layer;
   wherein the coloring layer is formed on a surface of the electrostatic shielding layer disposed close to the liquid crystal layer; and
   wherein the electrostatic shielding layer is not formed in at least a portion of an outer edge portion of the second substrate.

2. The liquid crystal device according to claim 1, wherein the coloring layer is formed on a surface of the electrostatic shielding layer disposed close to the second substrate.

3. The liquid crystal device according to claim 1, wherein steps are formed at a boundary portion of the light shielding layer and the coloring layer, and an uneven surface resembling the steps is formed on a top surface of the electrostatic shielding layer.

4. A lateral electric field mode liquid crystal device comprising:
   a first substrate;
   a second substrate;
   a liquid crystal layer sandwiched between the first substrate and the second substrate; and
   pixel electrodes and common electrodes which are formed on a surface of the first substrate disposed close to the liquid crystal layer, the lateral electric field mode liquid crystal device driving the liquid crystal layer by an electric field generated between the pixel electrodes and the common electrodes,
   wherein on a surface of the second substrate disposed close to the liquid crystal layer, a light shielding layer which is formed in areas including an area disposed between the pixel electrodes in a plan view and is capable of absorbing at least visible light, a coloring layer which is formed so as to overlap with the pixel electrodes in a plan view and is capable of transmitting light in a particular wavelength range, an overcoat layer for protecting the coloring layer, and an alignment film are formed in this order, and
   wherein an electrostatic shielding layer formed of a transparent conductive material is formed on a surface of the overcoat layer disposed close to the second substrate and a surface of the light shielding layer disposed close to the liquid crystal layer;
   wherein a driving circuit and drawing lines electrically connected to the driving circuit are formed on the surface of the first substrate disposed close to the liquid crystal layer, wherein the drawing lines and the electrostatic shielding layer are electrically connected at positions where they overlap with each other in a plan view via a conductive member sandwiched between the first substrate and the second substrate, and wherein the potential of the electrostatic shielding layer is controlled to be at predetermined potential by the driving circuit.

5. The liquid crystal device according to claim 4, wherein the potential of the electrostatic shielding layer is controlled to be at the same potential as the common electrodes.

6. The liquid crystal device according to claim 4,
wherein the first substrate has an insulating film which covers the drawing lines,
wherein contact holes are formed in the insulating film so as to expose portions of the drawing lines to a bottom portion thereof,
wherein a conductive film is formed in an inner portion of each of the contact holes so as to cover the drawing lines exposed to the bottom portion, and
wherein the electrostatic shielding layer is electrically connected to the drawing lines via the conductive member and the conductive film.

7. The liquid crystal device according to claim 6, wherein the conductive film is formed of conductive metal oxides.

8. The liquid crystal device according to claim 1,
wherein the pixel electrodes and the common electrodes are laminated on the surface of the first substrate disposed close to the liquid crystal layer via an insulating film, and
wherein the common electrodes are disposed closer to the liquid crystal layer than the pixel electrodes.

9. The liquid crystal device according to claim 1,
wherein a sealing member for sealing liquid crystal molecules is provided around the liquid crystal layer,
wherein a display area defined by the plurality of pixel electrodes is formed at an inner side of the area surrounded by the sealing member, and a non-display area is formed between the display area and the sealing member at the inner side of the area surrounded by the sealing member,
wherein electrostatic protection members capable of discharging static electricity entering into the display area are arranged on the non-display area of the first substrate, and
wherein the electrostatic shielding layer is disposed so as to overlap with the electrostatic protection members in a plan view.

10. An electronic apparatus comprising the liquid crystal device according to claim 1.

11. A method of manufacturing a lateral electric field mode liquid crystal device comprising:
a first substrate and a second substrate which are disposed to face each other;
a liquid crystal layer which is sandwiched between the first substrate and the second substrate;
pixel electrodes and common electrodes which are formed on a surface of the first substrate disposed close to the liquid crystal layer;
a light shielding layer which is formed on a surface of the second substrate, in a plan view, disposed close to the liquid crystal layer in areas including an area disposed between the pixel electrodes and is capable of absorbing at least visible light; and
an electrostatic shielding layer which is formed on a surface of the light shielding layer disposed close to the liquid crystal layer and is formed of a transparent conductive material, the lateral electric field mode liquid crystal device driving the liquid crystal layer by an electric field generated between the pixel electrodes and the common electrodes, the method comprising the steps of:
forming a light shielding material layer on one surface of the second substrate;
patterning the light shielding material layer to form openings and alignment marks which correspond to areas including the pixel electrodes in a plan view;
disposing a film forming mask so as to face the one surface to positioning the second substrate and the film forming mask using the alignment marks; and
forming a transparent conductive material layer on the one surface via the film forming mask to form the electrostatic shielding layer.

* * * * *